United States Patent
Kamay

(10) Patent No.: US 8,392,596 B2
(45) Date of Patent: Mar. 5, 2013

(54) METHODS FOR DETECTING AND HANDLING VIDEO AND VIDEO-LIKE CONTENT IN REMOTE DISPLAY SYSTEM

(75) Inventor: Yaniv Kamay, Modi' (IL)

(73) Assignee: Red Hat Israel, Ltd., Raanana (IL)

( * ) Notice: Subject to any disclaimer, the term of this patent is extended or adjusted under 35 U.S.C. 154(b) by 380 days.

(21) Appl. No.: 12/472,312

(22) Filed: May 26, 2009

(65) Prior Publication Data

US 2010/0306413 A1   Dec. 2, 2010

(51) Int. Cl.
    G06F 15/16    (2006.01)
(52) U.S. Cl. ........ 709/231; 709/217; 709/218; 709/219; 709/230; 709/232; 709/233; 709/234; 709/235
(58) Field of Classification Search .......... 709/217–219, 709/230, 231–235
See application file for complete search history.

(56) References Cited

U.S. PATENT DOCUMENTS

| | | | | |
|---|---|---|---|---|
| 5,574,934 | A * | 11/1996 | Mirashrafi et al. | 709/207 |
| 7,430,681 | B1 * | 9/2008 | Hobbs | 713/400 |
| 2003/0200507 | A1 * | 10/2003 | Stern et al. | 715/517 |
| 2006/0010392 | A1 * | 1/2006 | Noel et al. | 715/759 |
| 2008/0059648 | A1 * | 3/2008 | Manges | 709/231 |
| 2008/0065996 | A1 * | 3/2008 | Noel et al. | 715/753 |
| 2009/0228801 | A1 * | 9/2009 | Lee et al. | 715/730 |
| 2010/0211882 | A1 * | 8/2010 | Bailey et al. | 715/740 |

OTHER PUBLICATIONS

Qumranet, Solid ICE™, Connection Broker, Apr. 2008, 7 pages.
Qumranet, KVM-Kernel-based Virtualization Machine, White Paper, 2006, 5 pages.
Qumranet, Solid ICE™, Overview, Apr. 2008, 15 pages.
Qumranet, Solid ICE™, Provisioning Manager, Apr. 2008, 5 pages.
Qumranet, Solid ICE™, Virtual Desktop Server (VDS), Apr. 2008, 6 pages.
Red Hat Office Action for U.S. Appl. No. 12/472,320, mailed Oct. 4, 2011.
Red Hat Office Action for U.S. Appl. No. 12/472,320, mailed Mar. 12, 2012.

* cited by examiner

*Primary Examiner* — David Lazaro
*Assistant Examiner* — Edward Kim
(74) *Attorney, Agent, or Firm* — Lowenstein Sandler LLP

(57) ABSTRACT

Method and apparatus for improving streaming data of graphics remoting applications are described herein. According to one embodiment, a stream of data objects is generated, each data object representing graphics data associated with an image to be rendered at a client over a network. For each data object, it is detected whether the associated image includes a first region and a second region having content with different types of contents based on a changing rate of display output regions. The first region is compressed using a first compression method and the second region is compressed using a second compression method different than the first compression method. The graphics data associated with the compressed first region and second region is transmitted to the client over the network to be rendered at the client. Other methods and apparatuses are also described.

21 Claims, 9 Drawing Sheets

METHODS FOR DETECTING AND HANDLING VIDEO AND VIDEO-LIKE CONTENT IN REMOTE DISPLAY SYSTEM

CROSS-REFERENCE

This application is related to a co-pending U.S. patent application Ser. No. 12/472,320, filed May 26, 2009, entitled "Mechanism for Dynamically Changing Streaming Video Quality".

TECHNICAL FIELD

The present invention relates generally to graphics remoting applications. More particularly, this invention relates to detecting and handling video and video-like content in remote display system.

BACKGROUND

Graphics remoting systems allow computing device network clients to connect to a remote server and receive a visual representation of at least some of the graphics being displayed at or output by the server. Often the network client can display all the graphical output associated with the session. Likewise, the client may be allowed to interact with the session, injecting user input, generated from devices such as a mouse or keyboard connected to the client, into the server session.

In some computing environments, entities also use terminal servers to provide remote access to applications and data. A terminal server is a computer system that maintains applications that can be remotely executed by client computer systems. Input is entered at a client computer system and transferred over a network (e.g., using protocols based on the ITU T.120 family of protocols, such as, for example, Remote Desktop Protocol ("RDP")) to an application at the terminal server. The application processes the input as if the input was entered at the terminal server. The application generates output in response to the received input and the output is transferred over the network (e.g., also T.120 based protocols) to the client computer system. The client computer system presents the output data.

Thus, input is received and output is presented at the client computer system, while processing actually occurs at the terminal server. In most, if not all terminal server environments, input data (entered at a client computer system) typically includes mouse and keyboard data representing commands to an application and output data (generated by an application at the terminal server) typically includes video data for display at a display device.

Recently, desktop virtualization or virtual desktop infrastructure has become more popular. Desktop virtualization is a server-centric computing model that borrows from the traditional thin-client model but is designed to give system administrators and end-users the best of the ability to host and centrally manage desktop virtual machines in the data center while giving end users a full PC desktop experience.

Desktop virtualization provides many of the advantages of a terminal server, while providing with users much more flexibility. Each user, for example, might be allowed to install and configure his/her own applications. Users also gain the ability to access their server-based virtual desktop from other locations.

However, there has been a lack of efficient streaming mechanisms and/or data compression mechanisms to improve network traffic and processing efficiency of the client in a desktop virtualization environment.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
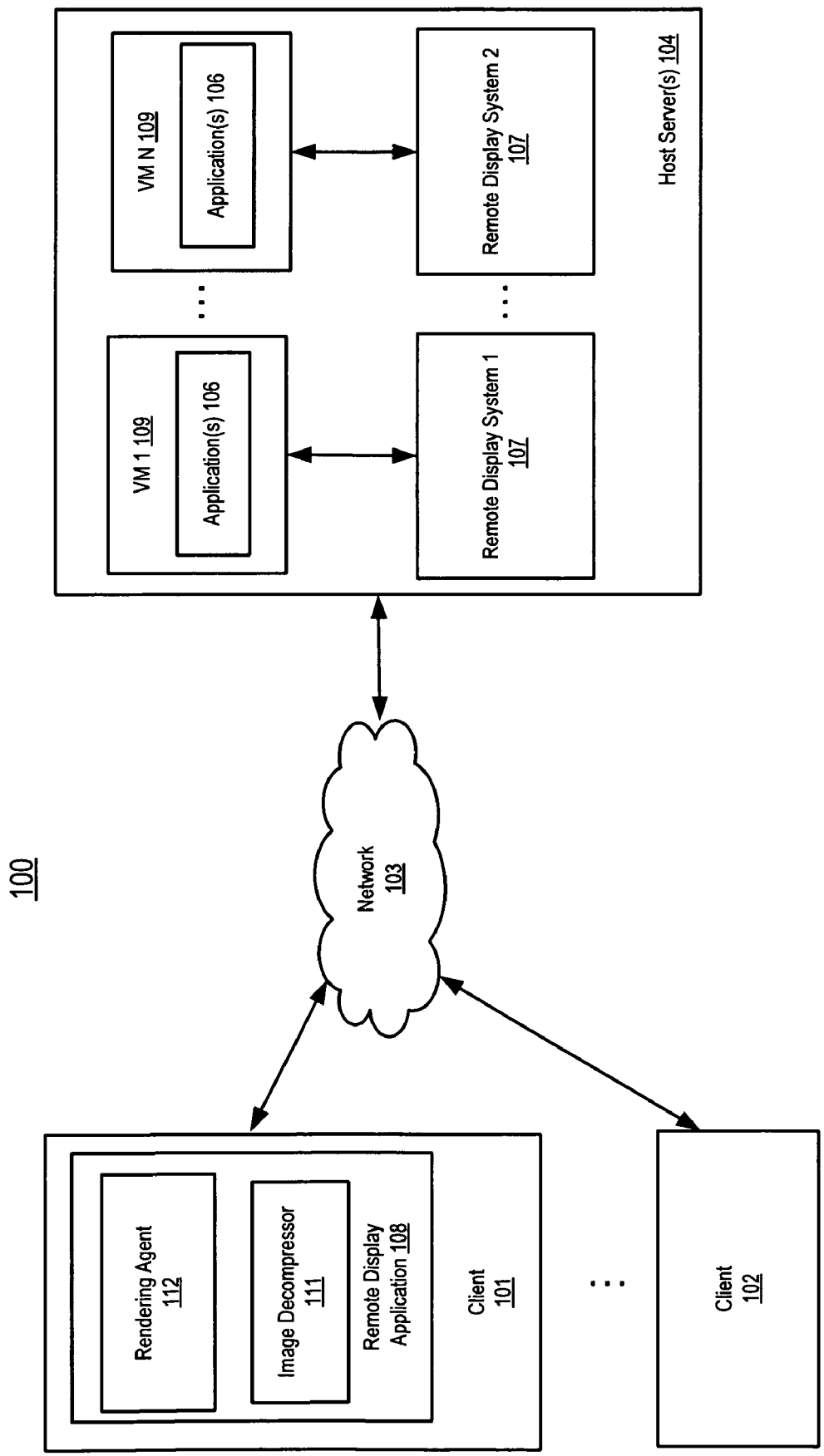
FIG. 1 is a block diagram illustrating an example of a network configuration according to one embodiment of the invention.

Method and apparatus for detecting and handling video and video-like content in a remote display system are described herein. In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments, graphics data associated with a frame or an image representing a display output of an application, (e.g., a desktop application) is processed to detect different areas or regions of the image in which the content changes in a relatively high rate, such as, for example, streaming video vs. textual content. By detecting the areas in which content is changed at high frequency, it can be assumed that the content is a part of a video stream and a different strategy can be applied to this content as opposed to a relatively static content. For example, content that changes at high frequency (e.g., video) does not require exact reconstruction of the original data (because such content is intended for human interpretation where the mind can easily "fill in the blanks"), and therefore such content can be transformed using a compression method producing a smaller compressed file (e.g., lossy compression algorithms). In contrast, regions of the image that have more static content (e.g., textual description, data records, etc.) require much more accurate reconstruction, and therefore can be compressed using a compression method producing a larger compressed file (e.g., lossless compression algorithms).

In addition, in one embodiment, during the streaming operations, network traffic conditions and/or client or server processing bandwidth are actively monitored by the hosting server and different compression methods, as well as compression parameters such as bit rates, may also be dynamically selected in view of the monitored network traffic conditions and/or client or server processing bandwidth.

In one embodiment, a time stamp can be added for audio synchronization, and video buffering can also be performed at the client side for video playback and/or lip-sync purposes. The application, which may run on a guest operating system (OS) in a virtual machine hosted by a server, may be accessed by a thin client application (e.g., browser) of a client over a network as if the application were running locally within the client. The data may be transmitted to the client using a variety of communication protocols, such as, for example, remote desktop protocol (RDP) available from Microsoft® Corporation of Redmond, Wash. or alternatively, SPICE™ (simple protocol for independent computing environments) protocol available from Qumranet, Inc. of Israel, a subsidiary of Red Hat, Inc. of Raleigh, N.C.

FIG. 1 is a block diagram illustrating an example of a network configuration according to one embodiment of the invention. Referring to FIG. 1, network configuration 100 includes, but is not limited to, one or more clients 101-102 communicatively coupled to a remote server or a cluster of servers 104 over a network 103. Network 103 may be a local area network (LAN) or a wide area network (WAN) and may be a combination of one or more networks. Clients 101-102 can be any computer system in communication with server 104 for remote execution of applications at server 104. For example, system 100 may be implemented as part of a graphics remoting system. Generally, a client such as client 101 can be a computer system in communication with server 104 for remote execution of applications at server 104. Thus, input data (e.g., mouse and keyboard input) representing application commands is received at the client and transferred over network 103 to server 104. In response to client side data, an application (e.g., application 106) can generate output display commands (e.g., graphics commands referred to herein as graphics data), which may include one or more paint and/or draw operations, for example, in the form of executable instructions. The output display commands can then be transmitted (e.g., as graphics update commands) with compression to the remote client and a remote display display application 108 of the remote client can collect the graphics commands and generate corresponding drawing commands for rendering data at the client.

In one embodiment, server 104 is configured to host one or more virtual machines 109, each having one or more applications 106. Applications 106 may be executed and hosted by an operating environment (e.g., an operating system, not shown) within virtual machine 109. Such an operating system in virtual machine 109 is also referred to as a guest operating system. Multiple guest operating systems and the associated virtual machines may be controlled by another operating system (also referred to as a host OS). Typically, a host OS represents a virtual machine monitor (VMM) (also referred to as a hypervisor) for managing the hosted virtual machines. A guest OS may be of the same or different type with respect to the host OS. For example, a guest OS may be a Windows operating system from Microsoft and a host OS may be a Linux operating system available from Red Hat. In addition, the guest OSes running on the host 104 can be of the same or different types.

Virtual machine 109 can be any type of virtual machines, such as, for example, hardware emulation, full virtualization, para-virtualization, and operating system-level virtualization virtual machines. Different virtual machines hosted by server 104 may have the same or different privilege levels for accessing different resources.

In one embodiment, server 104 hosts multiple virtual machines (e.g., virtual machine 109), each hosting or maintaining a desktop environment remotely accessed by a client such as clients 101-102 using a desktop application (e.g., application 106). A desktop application generates an output (e.g., an image to be displayed) that is referred to as a virtual desktop. Graphics data associated with virtual desktop is then captured and sent to a client such as clients 101-102, where the virtual desktop may be rendered by a rendering agent (e.g., agent 112) and presented by a client application (e.g., application 110) respectively.

In one embodiment, the server 104 hosts a remote display system 107 for each virtual machine 109 that is responsible for transferring graphics data associated with the desktop to clients 101-102. In particular, prior to transferring graphics data of the desktop to, in this example, client 101, remote display system 107 compresses different portions of an image using a variety of data compression methods, such as, for example, lossless or lossy compression methods or algorithms dependent upon certain characteristics of the image. For example, according to a particular embodiment, if an image contains one portion having different type of content (e.g., video content) than another portion of the image, different compression methods may be utilized to compress different portions of the same image.

In one embodiment, in addition or alternatively to compressing different regions of an image with different compression methods, real-time network traffic conditions of network 103 and/or local processing bandwidth of client 101 is actively monitored. During the streaming operations, different data compression methods and/or compression parameters such as bit rates may be dynamically selected or adjusted in view of different network traffic conditions and/or processing bandwidth (e.g., CPU usage) of a client. As a result, images (e.g., virtual desktop) rendered at client 101 can be synchronized in time efficiently for given network traffic conditions and/or local processing bandwidth, by sacrificing quality (e.g., resolution) of the images.

According to a particular embodiment, areas of an image in which content is changed in a relatively high rate are detected (e.g., according to a predetermined rate). By detecting such areas, it can be assumed that the content associated with the detected areas is related to a video stream. For such areas, different strategies may be employed, such as, for example, 1) converting the content into a video stream (e.g., using OGG Theora compression method); 2) compressing the content using a lossy compression method; or 3) changing video quality according to client/server/networking conditions. In addition, a time stamp may be added in the data stream for use at the client.

The compressed image is then transmitted to client 101 over network 103 using a variety of communications protocols, such as, for example, RDP protocol or a proprietary protocol such as SPICE™ protocol from Red Hat Israel.

In one embodiment, the client 101 hosts a remote display application 108 that includes an image decompressor 111 that receives the compressed data and identifies the corresponding decompression methods and uses the identified decompression methods to decompress the received data. The remote display application 108 may also include a rendering agent 112 that renders the image to be presented by the remote display application 110. The remote display application 110 may be a thin client application such as a browser application, data being transmitted from a server to a client may include graphics commands (e.g., paint and/or draw commands) as well as other information (e.g., location and/or shape, etc.) such that the client can execute or render the graphics commands to construct the associated image (e.g., virtual desktop image). In one embodiment, the image decompressor 111 employs video buffering for smooth video playback, lip synchronization, etc. at the client. The image decompression system 111 can use the time stamps attached to the compressed data to schedule the display of video frames held in the buffer. In addition, the image decompression system 111 can use the time stamps attached to the compressed data for audio synchronization (to synchronize the video stream with the audio stream).

System 100 may be implemented within a data center of an enterprise entity. It allows enterprises the benefit of centralized desktops without the need to change their applications or infrastructure. Enterprises benefit from an improvement in the manageability, security and policy enforcement for their desktop environment, and consequently, realize a significant reduction in the desktop TCO (total cost of ownership).

In one particular embodiment, server 104 is configured to run the virtualization platform/hypervisor and the virtual desktops. SPICE communication protocol is utilized to communicate between a client and a server. SPICE is a remote rendering technology developed specifically for virtual desktops that allow users to "see" their desktops and interact with them. In this embodiment, a user's desktop runs inside a kernel-based virtual machine (KVM) on the server 104 in the enterprise data center. The user then accesses his/her desktop from a thin client (e.g., client application 110) using SPICE protocol. System 100 may be implemented as part of Solid ICE™ (independent computing environment) virtualization solution available from Red hat Israel. Note that an application related to a virtual desktop is utilized herein as an example throughout this application for illustration purposes only. However, techniques described herein can also be applied to any kinds of graphics remoting applications.

Figure 2:
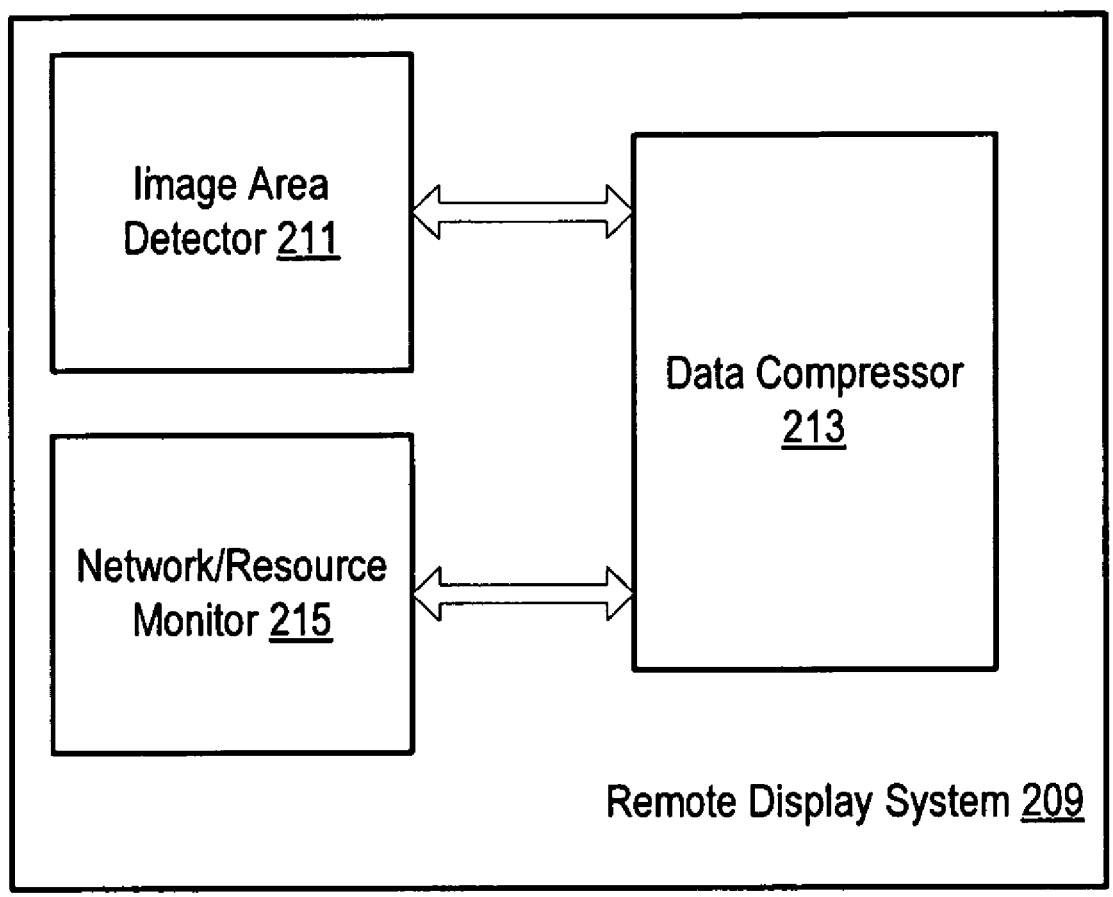
FIG. 2 is a block diagram illustrating an example of a remote display system according to one embodiment of the invention.

FIG. 2 is a block diagram illustrating an example of a remote display system 209 according to one embodiment of the invention. The system 209 may be implemented as part of the server 104 of FIG. 1. For example, the system 209 may be associated with a specific virtual machine and be part of the VMM or run on top of the VMM. It should be noted that the remote display system 209 may include various other components in addition to, or instead of, the component shown in FIG. 2.

Figure 3:
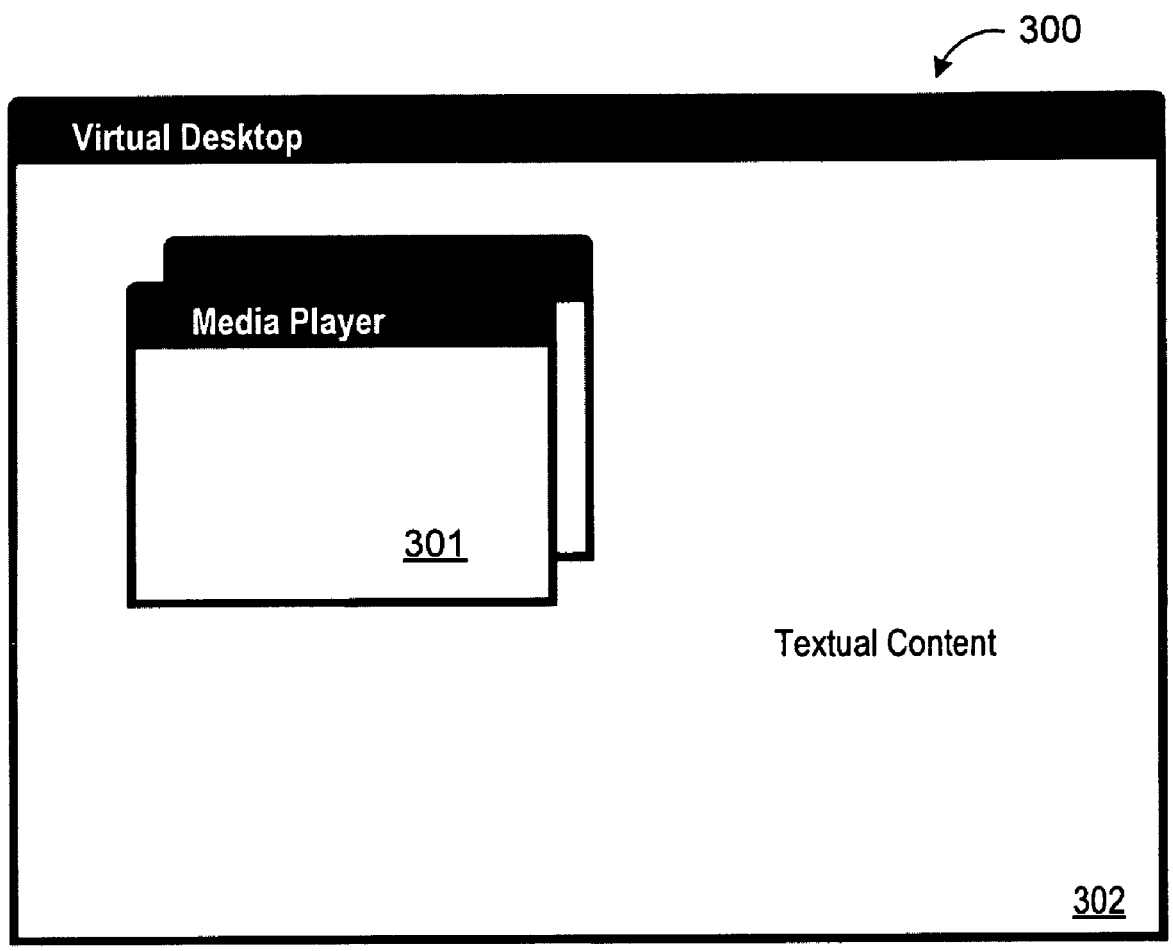
FIG. 3 is a screenshot representing a snapshot of a virtual desktop image according to one embodiment of the invention.

According to one embodiment, the system 209 includes an image area detector 211 and a data compressor 213. The image area detector 211 detects different display regions of a frame or an image that have different types of contents (e.g., stream video vs. textual content) based on graphics data generated from an application. As will be discussed in more detail below, in one embodiment, the detection is performed by identifying areas in the display that are changed at a relatively high frequency. A data compressor (e.g., data compressors 213-214) then compresses different types of contents using different types of data compression methods such as lossless or lossy compression methods. For example, as shown in FIG. 3, an image 300 represents a snapshot of a virtual desktop. Image 300 includes portions 301 corresponding to a streaming video window and a portion 302 corresponding to a "static" textual content (e.g. background of the desktop). The image area detector 211 is able to distinguish portion 301 from portion 302 and the data compressor 213 is able to compress portions 301-302 using different compression methods. In one embodiment, data associated with portion 301 is compressed using a lossy compression method while data associated with portion 302 is compressed using a lossless compression method. As a result, streaming of a virtual desktop is optimally improved in view of the content.

In another embodiment, the system 209 includes a network/resource monitor 215 and the data compressor 213. The network/resource monitor 215 actively monitors the network traffic conditions between the client and the server, as well as local client processing bandwidth such as CPU usage of the client, and the host's CPU load. For example, each virtual machine may be communicatively coupled to a client via a communications channel, such as a TCP (transport control protocol) socket connection, and the network/resource monitor 215 can listen to the traffic across the TCP socket connection and determine the current network traffic conditions, including network bandwidth and an indication of dropped frames. In addition, the network resource monitor 215 can determine the client's processing bandwidth information by, for example, exchanging application level event messages with the client. In particular, in one embodiment, before a virtual desktop is delivered to a client, the client has to log onto the virtual desktop server and provide client specific information to the host server such as hardware resource, capability, etc. Based on this information, the host may select a virtual desktop that is most appropriate for the client. Likewise, the network/resource monitor 215 can use a similar mechanism to determine the local client processing power.

The network/resource monitor 215 may inform the data compressor 213 about the current network traffic conditions between the client and the server, local client processing bandwidth, and/or the host's CPU load. In response, the data compressor 213 select a compression method and/or compression parameters such as a bit rate that is appropriate for the network conditions, the client and/or the server at this point in time. For example, if the current network bandwidth and/or client processing bandwidth is limited, the data compressor may use a lossy compression method (as opposed to a lossless compression method) and/or higher compression bit rate. Further, depending on the host's CPU load, a more or less computationally intense mechanism can be used for compression. Different frames or images of a data stream or a sequence of images may also be compressed using different compression methods and/or different compression parameters such as bit rates of the same compression method dependent upon certain specific circumstances. In another example, if certain frames are dropped due to a network traffic condition and/or client processing bandwidth (e.g., CPU usage), subsequent frames may be compressed using a different compression method such that the compressed file would be smaller. Alternatively, although keeping the same compression method, the compression parameter such as a bit rate may be adjusted higher. Although such an adjustment may cause quality of the virtual desktop image to be reduced, it balances communications between a client and a server, trading the quality of the images in exchange for higher communication bandwidth.

In yet another embodiment, the system 209 includes the image area detector 211, the network/resource monitor 215 and the data compressor 213. The image area detector 211 detects regions in the display that are changed at relatively high frequency (video or video-like content) and informs the data compressor 213 of such regions. The network/resource monitor 215 informs the data compressor 213 of the current network traffic conditions between the client and the server, client processing bandwidth, and/or the host's CPU load. The data compressor 213 uses these inputs to select a compression method appropriate for the video or video-like content and then adjusts the bit rate of the selected compression method based on the current network traffic conditions, client processing bandwidth, and/or host CPU load.

In one embodiment, the network/resource monitor 215 works in tandem with the image area detector 211 to determine whether some of the frames have been dropped. In particular, if the image area detector 211 determines that a certain area of the image has been changed from a previous frame but the network/resource monitor 215 determines that the previous frame was not received at the client, then it is know that the previous frame was dropped. Based on drop frames statistics, the data compressor 213 automatically adjusts the compression method and/or bit rate. In addition, the result of the adjustment can be monitored (the change in the drop statistics) to deduce the reasons for frame drops and to avoid the frame drops in the future.

Figure 4A:
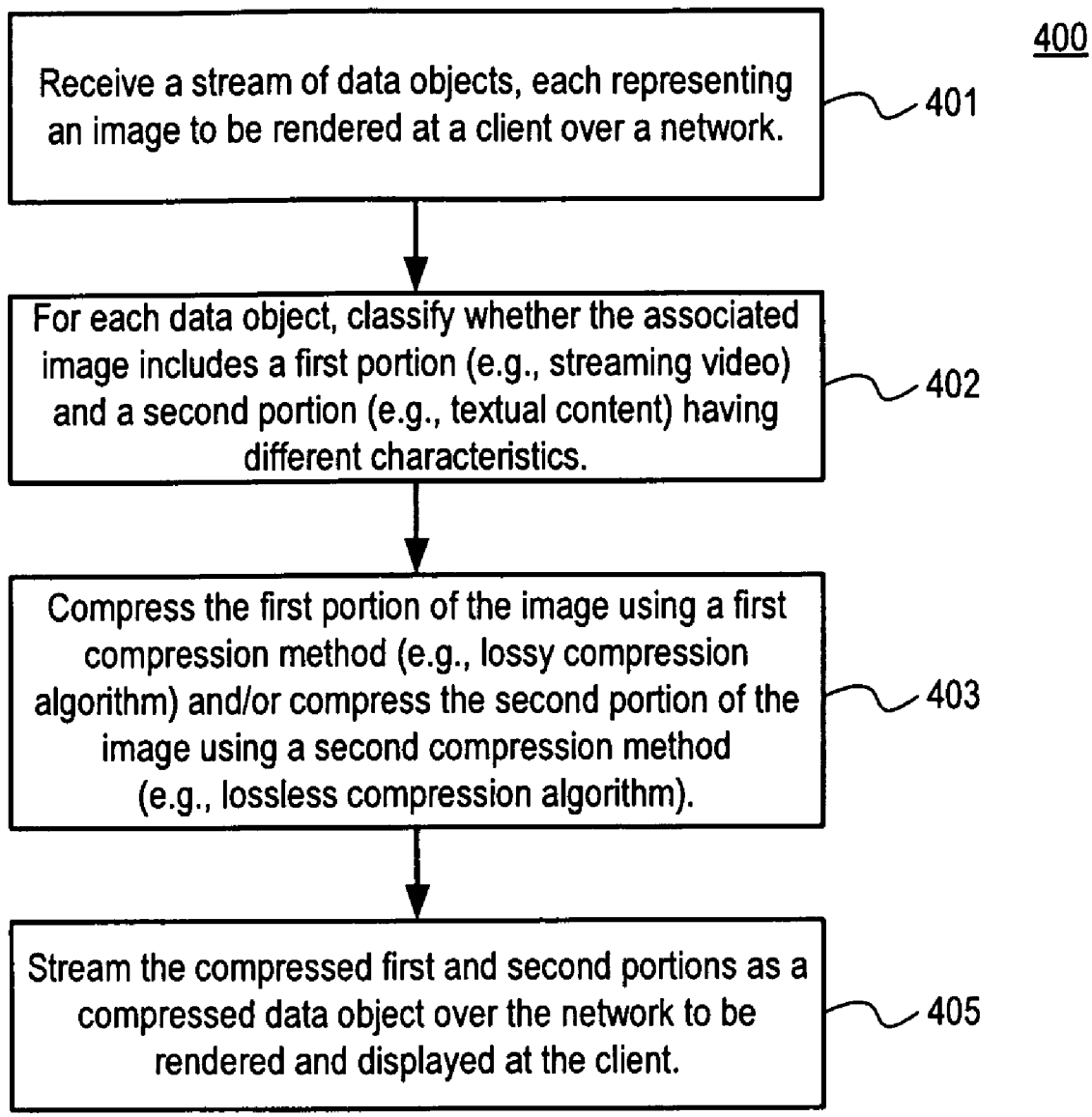
FIG. 4A is a flow diagram illustrating an example of a method for handling image data in a remote display system according to one embodiment of the invention.

FIG. 4A is a flow diagram illustrating an example of a method 400 for handling image data in a remote display system according to one embodiment of the invention. Note that method 400 may be performed by processing logic which may include software, hardware, or a combination of both. For example, method 400 may be performed by system 209 of FIG. 2.

Referring to FIG. 4A, at block 401, a stream of data objects is received where each data object includes graphics data representing an image to be transmitted and rendered at a client. In one embodiment, the data objects are generated from a desktop application (e.g., desktop operating system) running within a virtual machine, and the image is a virtual desktop image.

For each data object, at block 402, processing logic detects the associated image that includes a first portion and second portion that have different types of contents. For example, as shown in FIG. 3, processing logic may identify that virtual desktop 300 includes portions 301 having streaming video content and portion 302 having relatively static textual content. One embodiment of detecting video and video-like content will be discussed in more detail below in conjunction with FIG. 4B.

Once different regions of the image are identified, different data compression methods or algorithms can be employed to compress different regions to further optimize streaming of the virtual desktop. In one embodiment, at block 403, regions of an image that have video or video-like content are compressed using a lossy compression method and regions of the same image that have relatively static content (e.g., textual description, data records, etc.) are compressed using a lossless compression method. Thereafter, at block 405, the compressed regions of the image are transmitted as a compressed object to the client over the network to be rendered and displayed at the client (e.g., as part of a virtual desktop environment). In one embodiment, the entire image may be compressed and transmitted over to the client. Alternatively, a differential encoding technique may be utilized in which only differences of between a current frame and a previous frame are compressed and transmitted over to the client to further improve streaming efficiency. In one embodiment, a time stamp (and optionally other metadata) is attached to each compressed region including video or video-like content.

Lossless data compression is a class of data compression algorithms that allows the exact original data to be reconstructed from the compressed data. The term "lossless" is in contrast to "lossy" data compression, which allows an approximation of the original data to be reconstructed, in exchange for better compression parameters such as bit rates. Lossless data compression is used in many applications. For example, it is used in the popular ZIP file format. Lossless compression is used when it is important that the original and the decompressed data be identical, or when no assumption can be made on whether certain deviation is uncritical.

Most lossless compression programs use two different kinds of algorithms: one which generates a statistical model (e.g., static model or adaptive model) for the input data, and another which maps the input data to bit sequences using this model (e.g., Huffman, DEFLATE, or arithmetic coding) in such a way that "probable" (e.g. frequently encountered) data will produce shorter output than "improbable" data. Accordingly, a variety of lossless compression methods can be utilized herein, such as, for example, LZW, DEFLATE, JPEG-2000, etc.

A lossy compression method is one where compressing data and then decompressing it involves retrieving data that may well be different from the original, but is close enough to be useful in some way. Lossy compression is most commonly used to compress multimedia data (audio, video, still images), especially in applications such as streaming media and internet telephony. By contrast, lossless compression is required for text and data files, such as bank records, text articles, etc. Lossy compression formats suffer from generation loss: repeatedly compressing and decompressing the file will cause it to progressively lose quality. This is in contrast with lossless data compression.

The advantage of lossy methods over lossless methods is that in some cases a lossy method can produce a much smaller compressed file (which requires less network bandwidth to transmit) than any known lossless method, while still meeting the requirements of the application. Examples of lossy compression methods include, but are not limited to, wavelet compression, JPEG-2000, MPEG-1, MPEG-2, and MPEG-4, etc. Again, any kind of lossless and lossy compression methods can be utilized herein.

Figure 4B:
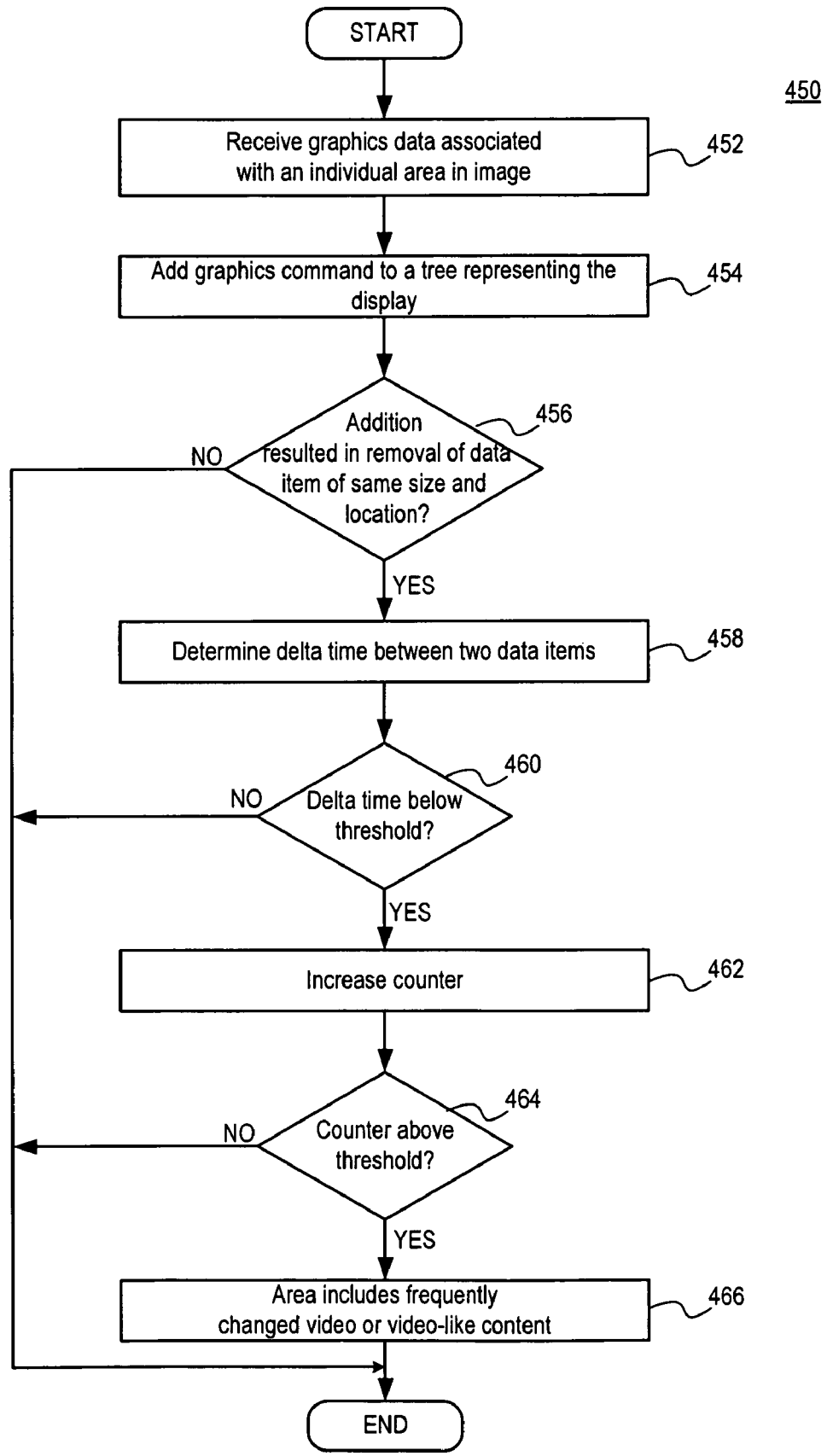
FIG. 4B is a flow diagram illustrating an example of a method for detecting video or video-like area in the image according to one embodiment of the invention.

FIG. 4B is a flow diagram illustrating an example of a method 450 for detecting areas in an image that have video or video-like content, according to one embodiment of the invention. Note that method 450 may be performed by processing logic which may include software, hardware, or a combination of both. For example, method 400 may be performed by system 209 of FIG. 2.

Referring to FIG. 4B, at block 452, graphics data associated with an individual area in the image is received. At block 454, the graphics data (e.g., a graphics command) is added to a tree representing the display (e.g., virtual desktop). The addition may include insertion of a corresponding data item at a new location in the tree or replacement of an existing data item with the new data item.

At block 456, processing logic determines whether the addition of the new data item resulted in removal of a data item of the same size and at the same position. If not, then the image area being processed has not been changed since the last frame (or image), and the data item is not used for stream detraction, and method 450 ends. If so, processing logic determines the time interval between the addition of the old item and the addition of the new item (block 458). If the time interval is not below a threshold (block 460), then the image area being processed has not change quickly enough, and method 450 ends.

If the time interval is below a threshold (block 460), then the image area being processed has changed rather quickly since the last frame. Processing logic increases a counter associated with this area (block 462) and determines whether the resulting counter exceeds a threshold (block 466). If not, then changes of the area have not been frequent enough yet to classify as video or video-like content. If so, then the content of the area has changed at sufficiently high frequency, and the area is considered to include video or video-like content (block 466).

In one embodiment, method 450 also performs stream trace operations to keep the history of the images in the stream for fast recovery of the image stream.

Method 450 may be performed for each area in the current image or frame. An area may be of a specific size that may be configurable by a user or predetermined programmatically. In one embodiment, method 450 is performed for each image at block 402 of FIG. 4A.

In one embodiment, as a result of block 466 of method 450, a stream object is created and the activity of the stream object is tracked. If it is determined that the stream object has been inactive for a time period longer than a threshold, the remote display system terminates this stream object, sends a command to the client to remove this stream, and resends the last frame to the client, thus improving the image quality in the stream area.

Figure 5:
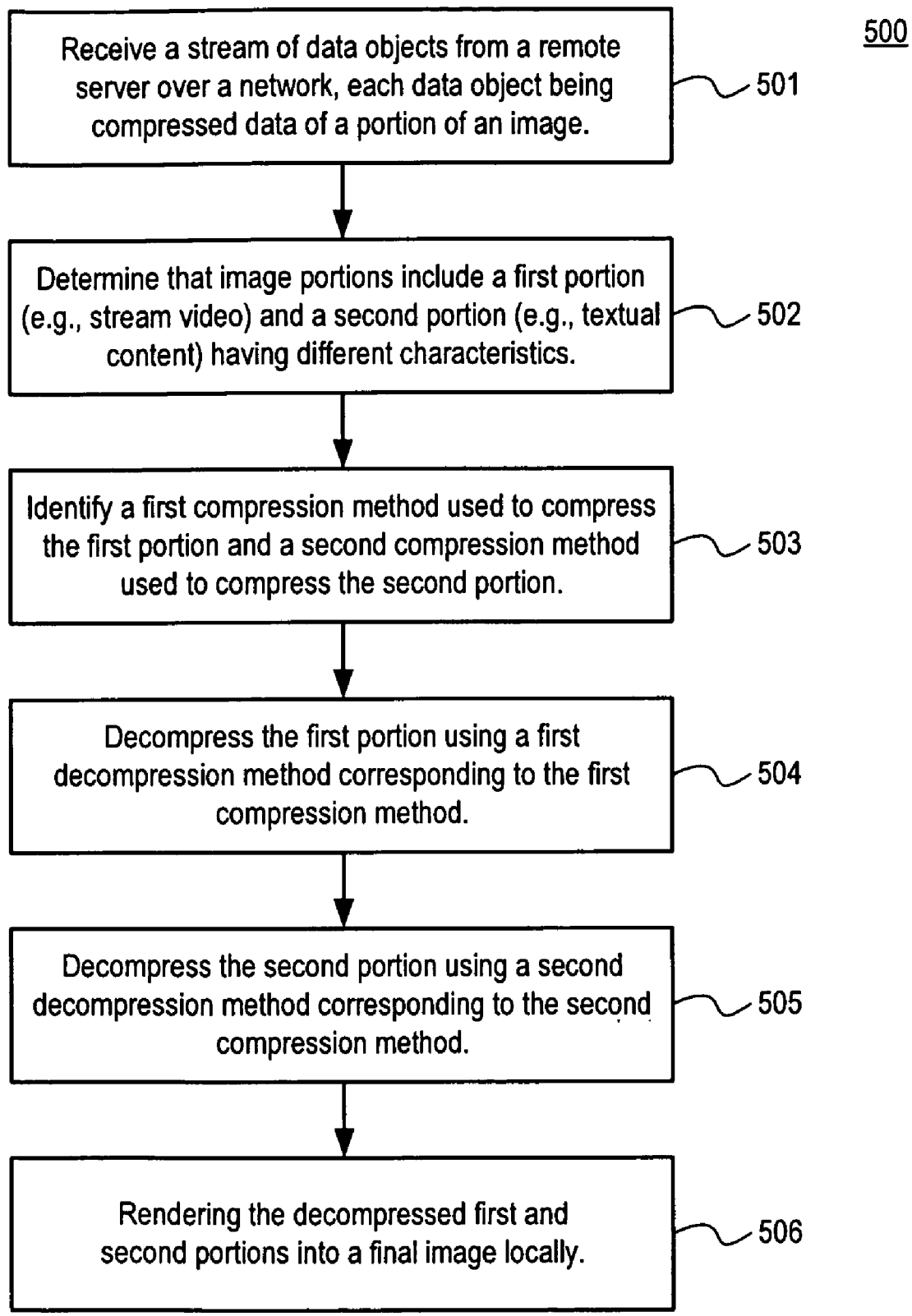
FIG. 5 is a flow diagram illustrating an example of a method for rendering data in a remote display system according to one embodiment of the invention.

FIG. 5 is a flow diagram illustrating an example of a method for rendering data according to one embodiment of the invention. Note that method 500 may be performed by processing logic which may include software, hardware, or a combination of both. For example, method 500 may be performed by any of clients 101-102 of FIG. 1.

Referring to FIG. 5, at block 501, a stream of data objects is received from a remote server (e.g., remote virtual desktop server) over a network. Each data object representing compressed data of a portion of an image.

At block 502, processing logic determines (based on metadata of the data objects) that the portions of the image include a first portion and a second portion that have been compressed using different compression methods (e.g., lossless or lossy compression methods). At block 503, such compression methods are identified. The compression methods may be identified based on certain identification information (e.g., metadata) embedded at a predetermined location associated with the data stream or the corresponding image and provided by the remote server. Once the compression methods are identified, at blocks 504-505, the determined first portion and second portions are decompressed using decompression methods corresponding to the identified compression methods respectively. In one embodiment, a first portion is related to a region of the image having active content such as streaming video content and the second portion is related to a region of the image having relatively static content. The first portion is compressed at the remote server using a lossy compression method while the second portion is compressed using a lossless compression method. The lossy and lossless methods may be any one of those compression methods described above. Thereafter, at block 506, the decompressed portions are rendered as a final virtual desktop image to be presented locally at a client application, such as a thin client application (e.g., browser). Other operations may also be performed.

As discussed above, in one embodiment, method 400 attaches time stamps to the compressed portions including video (or video-like) content. For portions including video or video-like content, an assumption can be made that visual updates may be delayed at the client in contrast with other portions that can be in direct communication with the user (e.g., buttons, links, etc.). Based on this assumption, method 500 can hold several video frames in a buffer on the client, and then use the attached time stamps to schedule the display of video frames held in the buffer. In addition, method 500 can use the attached time stamps for audio synchronization (to synchronize the video stream with the audio stream). Further, method 400, prior to transmitting video frames to the client, may hold several video frames at the server to reduce frame drops in case of high network load, and/or to reduce client side memory requirements in case of a long audio jitter buffer.

According to certain embodiments, alternatively to using different compression methods to compress different regions of an image, different frames or images of a data stream or a sequence of images may also be compressed using different compression methods and/or different compression parameters such as bit rates of the same compression method dependent upon certain specific circumstances. For example, if certain frames are dropped due to a network traffic condition and/or client processing bandwidth (e.g., CPU usage), subsequent frames may be compressed using a different compression method such that the compressed file would be smaller. Alternatively, although keeping the same compression method, the compression parameter such as a bit rate may be adjusted higher. Although such an adjustment may cause quality of the virtual desktop image to be reduced, it balances communications between a client and a server. In this situation, the system trades in the quality of the images in exchange for higher communication bandwidth.

Figure 6:
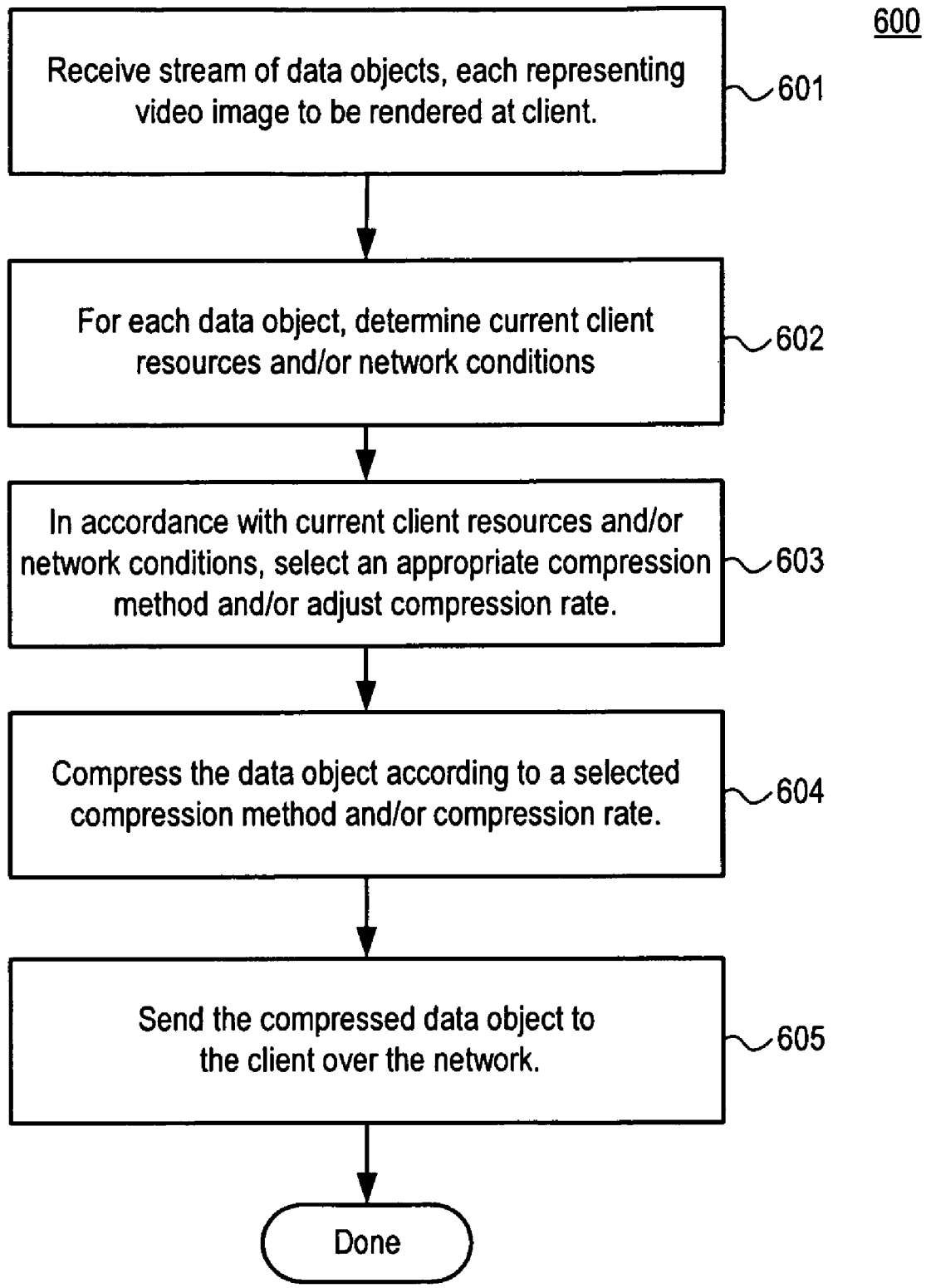
FIG. 6 is a flow diagram illustrating an example of a method for handling image data in a remote display system according to another embodiment of the invention.

FIG. 6 is a flow diagram illustrating an example of method for handling image data in a remote display system according to another embodiment of the invention. Note that method 600 may be performed by processing logic which may include software, hardware, or a combination of both. For example, method 600 may be performed by system 209 of FIG. 2.

Referring to FIG. 6, at block 601, processing logic receives a stream of data objects, where each data object includes graphics data representing a video frame or a video image (e.g., a virtual desktop image) to be transmitted and rendered at a remote client over a network. The data objects may be generated by an application (e.g., desktop operating system) running within a virtual machine.

Prior to compressing each of the data objects, at block 602, processing logic determines the current network traffic conditions and/or the client local processing power. If there is any significant change in the network conditions (e.g., network bandwidth) or the client's processing bandwidth, processing logic dynamically selects a compression method and/or adjusts compression parameters such as a bit rate that is most appropriate for the current network conditions and/or client resources (block 603). At block 604, processing logic compresses the data object using the selected compression method and/or adjusted compression parameters such as a bit rate and thereafter, at block 605, the compressed data object is transmitted to the client for rendering over the network. Note that certain information for identifying a specific compression method and/or compression parameters such as a bit rate may also be transmitted over to the client. Other operations may also be performed.

In an alternative embodiment, method 600 is used in conjunction with method 400. In particular, for image regions including video or video-like content detected by method 400, the compression method and/or compression parameters are selected using the current network conditions and/or client resources, as discussed above in conjunction with method 600.

Figure 7:
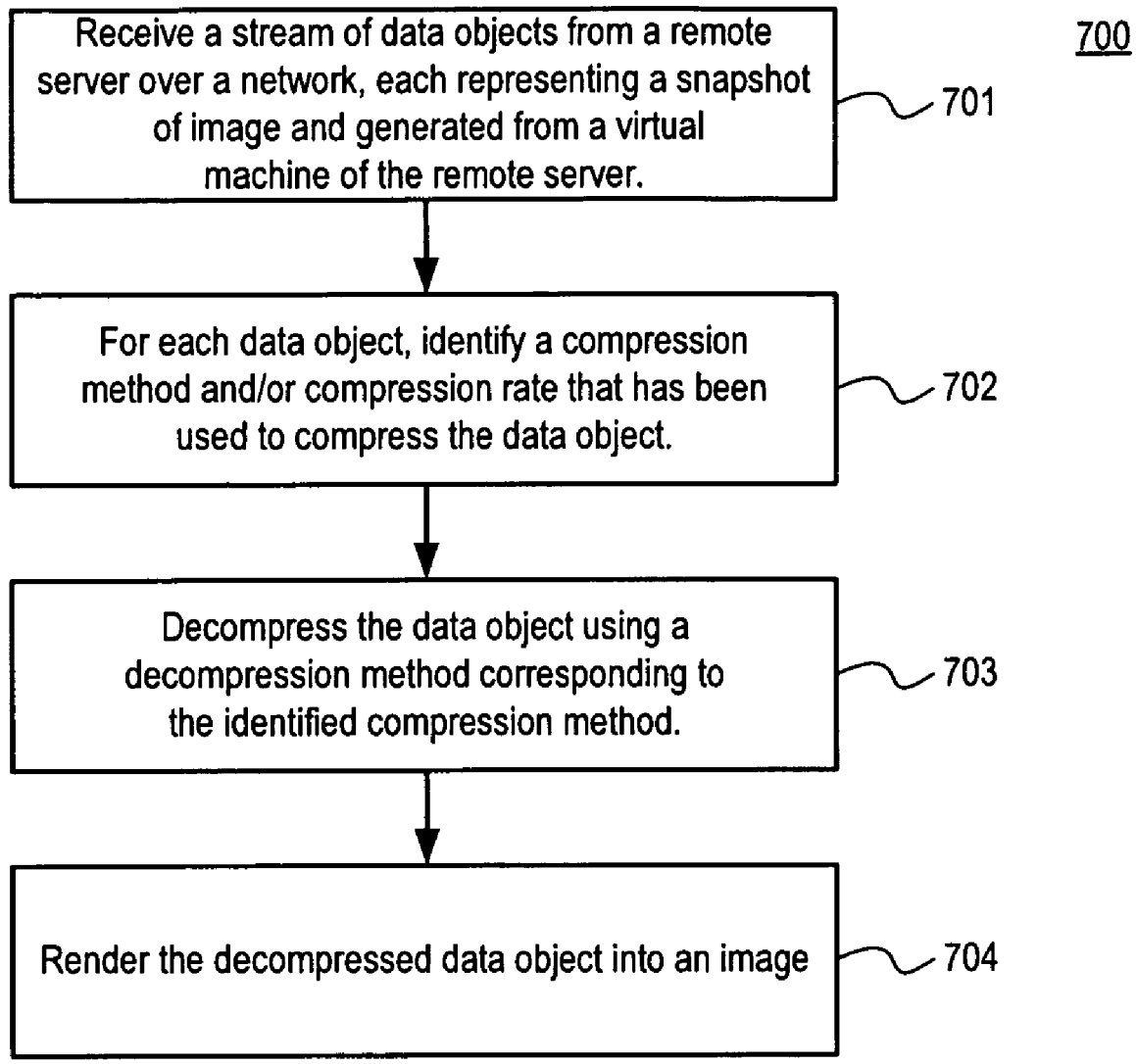
FIG. 7 is a flow diagram illustrating an example of a method for rendering data in a remote display system according to another embodiment of the invention.

FIG. 7 is a flow diagram illustrating an example of a method for rendering data in a remote display system according to another embodiment of the invention. Note that method 700 may be performed by processing logic which may include software, hardware, or a combination of both. For example, method 700 may be performed by any of clients 101-102 of FIG. 1.

Referring to FIG. 7, at block 701, a stream of data objects is received from a remote server over a network. Each data object includes graphics data representing a video frame or image (e.g., virtual desktop image) which is generated and compressed within a virtual machine of the remote server. At block 702, for each data object, processing logic identifies a compression method and/or compression parameters such as a bit rate used to compress the data object (e.g., based on metadata of the data object). At block 703, processing logic decompresses the data object using a decompression method corresponding to the identified compression method. At block 704, the decompressed data object is then rendered into an image to be presented locally at a client such as a thin client. Other operations may also be performed.

Note that as described above, different compression methods and/or compression parameters such as bit rates may be applied to different video frames or images of a stream of frames or images or alternatively, they can be applied to different regions of the same frame or image. The techniques described above can also be combined to compress a steam of data objects. For example, different images of the stream may be compressed using different compression methods and/or compression parameters such as bit rates, while different regions within certain images therein may also be compressed using different compression methods and/or compression parameters such as bit rates. Other configurations may also exist.

Figure 8:
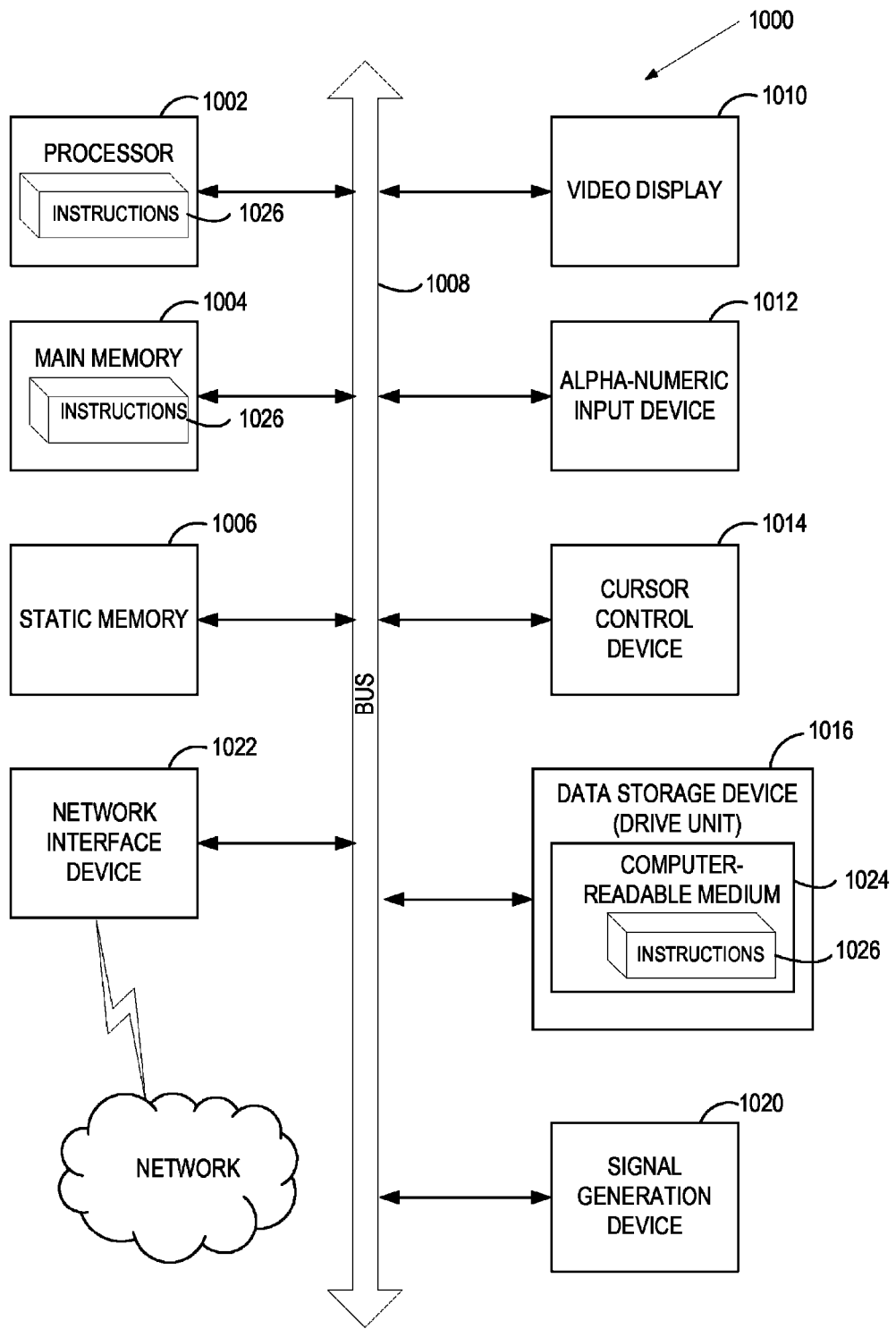
FIG. 8 is a block diagram illustrating an example of a data processing system which may be used with an embodiment of the invention.

FIG. 8 is a block diagram illustrating a data processing system which may be used with an embodiment of the invention. For example, system 1000 may be implemented as part of a client and/or a server described above. System 1000 illustrates a diagrammatic representation of a machine in the exemplary form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing device (processor) 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1016, which communicate with each other via a bus 1008.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The processor 1002 is configured to execute the instructions 1026 for performing the operations and steps discussed herein.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The data storage device 1018 may include a machine-accessible storage medium 1024 on which is stored one or more sets of instructions 1026 (e.g., software) embodying any one or more of the methodologies or functions described herein. The software may also reside, completely or at least partially, within the main memory 1004 and/or within the processor 1002 during execution thereof by the computer system 1000, the main memory 1004 and the processor 1002 also constituting machine-accessible storage media. The software may further be transmitted or received over a network via the network interface device 1022.

Thus, method and apparatus for improving streaming data of graphics remoting applications have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A computer-implemented method, comprising:
for a data object in a stream representing graphics data associated with an image to be
rendered at a client over a network, determining, by a host, that the image includes a first region having content changing at a first rate across a sequence of images and a second region having content changing at a second rate across the sequence of images;
determining, based on the first rate, that the first region includes streaming video;
determining, based on the second rate, that the second region includes textual description;
upon determining that the first region includes the streaming video and the second region
includes the textual description, compressing, by the host, the first region using a first compression method and compressing the second region using a second compression method different from the first compression method, wherein the first compression method is to produce a smaller compression file than the second compression method; and
transmitting, by the host, graphics data associated with the compressed first region and the compressed second region to the client over the network to be rendered at the client.

2. The method of claim 1, wherein the first compression method comprises a lossy data compression method and the second compression method comprises a lossless data compression method.

3. The method of claim 2, wherein the first region comprises actively changed content across the sequence of images, and wherein the second region comprises relatively static content across the sequence of images.

4. The method of claim 1, wherein detecting whether the image includes a first region and a second region comprises:
identifying a graphics command associated with an area in the image;
adding a new data item corresponding to the graphics command to the area in the image on a display; and
determining whether an addition of the new data item to the area indicates that the area has content that changes frequently.

5. The method of claim 4, wherein determining whether an addition of the new data item to the area indicates that the area has content that changes frequently comprises:
if the addition of the new data item resulted in removal of an old data item, determining a time interval between an addition of an old data item to a tree representing the display and the addition of the new data item to the tree; and
if the time interval is below a threshold, determining that content of the current area has changed, and determining whether a change of the content satisfies a frequency criterion.

6. The method of claim 5, wherein the new data item is of the same size as the old data item.

7. The method of claim 5, wherein the new data item has the same location in the tree as the old data item.

8. The method of claim 1, wherein data objects of the stream are generated from a desktop application executed within a virtual machine (VM) and accessed remotely by the client over the network.

9. The method of claim 1, further comprising adding a time stamp to each region for use at the client, the client holding a plurality of video frames and scheduling display of the plurality of video frames using corresponding time stamps.

10. The method of claim 1, further comprising adding a time stamp to each region for use at the client, the client synchronizing a video stream with an audio stream using corresponding time stamps.

11. A non-transitory computer readable storage medium including instructions that, when executed by a processing system, cause the processing system to perform a method comprising:
for a data object in a stream representing graphics data associated with an image to be
rendered at a client over a network, determining, by a host, that the image includes a first region having content changing at a first rate across a sequence of images and a second region having content changing at a second rate across the sequence of images;
determining, based on the first rate, that the first region includes streaming video;
determining, based on the second rate, that the second region includes textual description;
upon determining that the first region includes the streaming video and the second region
includes the textual description, compressing, by the host, the first region using a first compression method and compressing the second region using a second compression method different from the first compression method, wherein the first compression method is to produce a smaller compression file than the second compression method; and transmitting, by the host, graphics data associated with the compressed first region and the compressed second region to the client over the network to be rendered at the client.

12. The computer readable storage medium of claim 11, wherein:
the first compression method comprises a lossy data compression method and the second compression method comprises a lossless data compression method; and
the first region comprises actively changed content across the sequence of images, and the second region comprises relatively static content across the sequence of images.

13. The computer readable storage medium of claim 11, wherein detecting whether the image includes a first region and a second region comprises:
identifying a graphics command associated with an area in an image;
adding a new data item corresponding to the graphics command to the area; and
determining whether an addition of the new data item indicates that the area has content that changes frequently.

14. The computer readable storage medium of claim 11, further comprising adding a time stamp to each region for use at the client, the client holding a plurality of video frames and scheduling display of the plurality of video frames using corresponding time stamps.

15. The computer readable storage medium claim 11, further comprising adding a time stamp to each region for use at the client, the client synchronizing a video stream with an audio stream using corresponding time stamps.

16. A data processing system, comprising:
a processor;
a memory;
a virtual machine (VM) executed from the memory;
a guest operating system (OS) executed within the VM, the guest OS including
an application running therein to generate a stream of data objects, each data object representing graphics data associated with an image to be rendered at a client over a network, and
a remote display system, coupled to the VM, to:
detect whether the image includes a first region having content changing at a first rate across a sequence of images and a second region having content changing at a second rate across the sequence of images,
determine, based on the first rate, that the first region includes streaming video,
determine, based on the second rate, that the second region includes textual description,
upon determining that the first region includes the streaming video and the second region includes the textual description, compress the first region using a first compression method and compress the second region using a second compression method different from the first compression method, wherein the first compression method is to produce a smaller compression file than the second compression method, and
transmit graphics data associated with the compressed first region and the compressed second region to the client over the network to be rendered at the client.

17. The system of claim 16, wherein:
the first compression method comprises a lossy data compression method and the second compression method comprises a lossless data compression method; and
the first region comprises actively changed content across the sequence of images, and the second region comprises relatively static content across the sequence of images.

18. The system of claim 16, wherein the remote display system
detects whether the image includes a first region and a second region by:
identifying a graphics command associated with an area in an image;
adding a new data item corresponding to the graphics command to the area; and
determining whether an addition of the new data item indicates that the area has content that changes frequently.

19. The system of claim 16, wherein the remote display system is further to add a time stamp to each region for use at the client.

20. The system of claim 19, wherein the client holds a plurality of video frames and schedules display of the plurality of video frames using corresponding time stamps.

21. The system of claim 19, wherein the client synchronizes an audio stream with a clock using corresponding time stamps.

* * * * *